Feb. 7, 1967 W. F. BENNETT 3,302,588
AERIAL TRAMWAY SAFETY DEVICES
Filed July 7, 1964

INVENTOR
William Frederick Bennett.

United States Patent Office 3,302,588
Patented Feb. 7, 1967

3,302,588
AERIAL TRAMWAY SAFETY DEVICES
William Frederick Bennett, 940 15th St., West
Vancouver, British Columbia, Canada
Filed July 7, 1964, Ser. No. 380,889
2 Claims. (Cl. 104—178)

This invention relates to a safety device for detecting derailments on aerial tramways. The aerial tramways referred to in this invention include all forms of overhead cable transportation systems commonly referred to as gondola lifts, T-bar lifts and Poma-lifts.

It is common practice on aerial tramways to use a safety device to detect a derailment of the driving cable. This detector is then arranged to stop the tramway drive, thereby greatly reducing both the damage done to the tramway and the danger to human passengers. Present detection devices utilize the principle of mechanically breaking a part of the detector to produce the necessary signal, e.g., by breaking a shear pin, thus permitting a switch to operate, or by breaking an electrical conductor. Detectors of this type may, however, be ineffective because they depend upon the derailed cable moving in a prescribed direction with respect to the pulley to achieve operation, thus it is possible for a derailment to occur without operating the protective device. They are, moreover, unsatisfactory for winter operation because accumulations of ice and snow on the pulleys and supports may, either prevent correct operation of the safety device due to the ice binding the moving parts together, or cause false operation of the safety device due to the detector being operated when the ice breaks off the pulleys and supports.

I have found that these disadvantages may be overcome by using a detector that continuously detects the correct position of the cable, rather than attempting to detect the position of the cable after a derailment has occurred. This can be done by using the magnetic properties of the cable in conjunction with a small permanent magnet and a switch that is actuated by the presence of a magnetic field. My detector thus discriminates between a normal position of the cable and derailment thereof.

Figure 1:
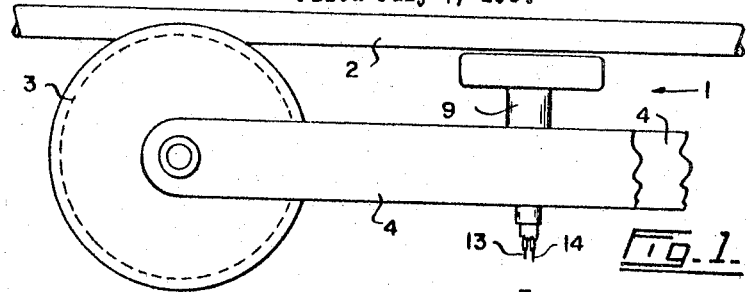
Figure 1A:
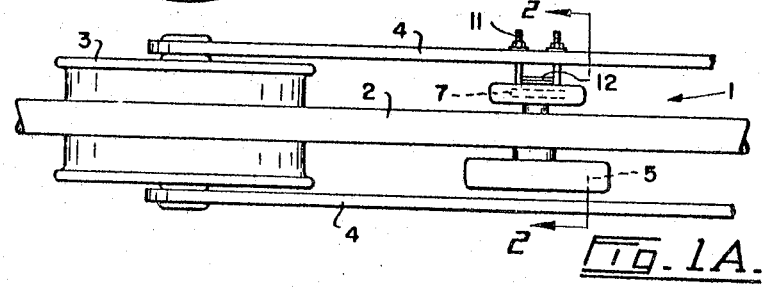
Figure 3:
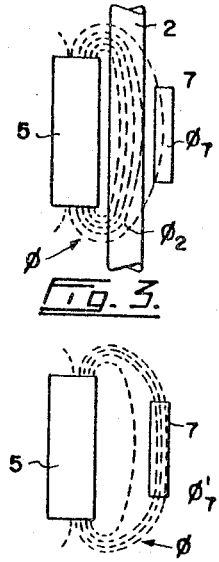
Figure 4:
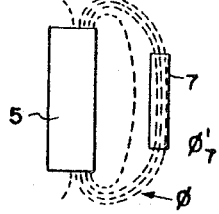
Figure 5:
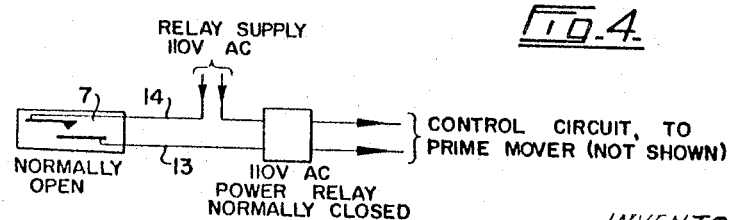

In the drawings which illustrate the invention:
FIGURE 1 is an elevation of one embodiment,
FIGURE 1A is a plan view of FIGURE 1,
FIGURE 2 is a fragmented section on line 2—2 of FIGURE 1, on a larger scale,
FIGURE 3 is a diagram illustrating the magnetic flux through the cable,
FIGURE 4 is a diagram illustrating the flux through the magnetic switch in the absence of the cable,
FIGURE 5 is a block schematic diagram showing one method of connecting the detector to control a prime mover.

In FIGURE 1, the detector assembly, indicated generally by the number 1, is used to detect a derailment of the cable 2 from the pulley 3. The detector is adjustably secured to one of the fixed framework members 4 carrying the pulley. It is to be understood that the fixed members 4 are carried by the towers (not shown) of the system.

Figure 2:
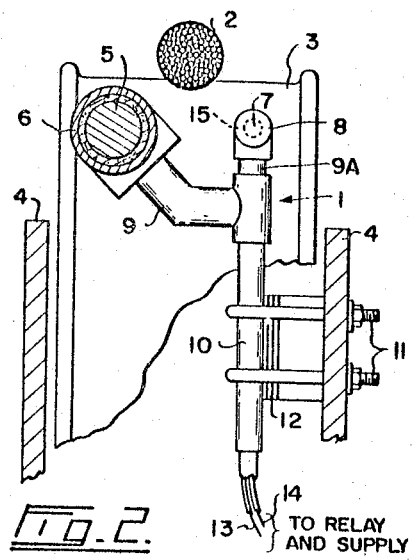

As shown in detail in FIGURE 2, the assembly includes a permanent magnet 5 mounted in a protective non-magnetic case 6, and a sensing device, suitably a magnetically actuated switch 7, also mounted in a protective non-magnetic case 8.

The magnet 5 and the magnetic switch 7 are separated by a distance sufficient to allow the cable 2 and any associated clamps to pass freely through the gap. The magnet 5 is of a size sufficiently large to cause positive operation of the normally open switch 7 when the space between the magnet 5 and the switch 7 is free of magnetic material. When the detector is correctly positioned with the cable 2 between the magnet 5 and the switch, the magnetic properties of the cable 2 reduce the strength of the magnetic field in the vicinity of the switch 7 to a level below that which is necessary to close the contacts thereof—see FIGURES 2 and 3. The position of the cable 2 relative to the sheave 3 and the detector 1, as shown in FIGURES 1A and 2, I refer to as the normal position. I prefer to use a permanent magnet in the detector, but an electro-magnet may be used.

The protective non-magnetic cases 6, 8, the magnet support 9, and the detector support 9A, are, suitably, made from standard copper pipe and solder type fittings assembled to the vertical support member 10, also a standard copper pipe. Other non-magnetic material, for example a suitable plastic, may be used in lieu of the copper fittings.

As best seen in FIGURE 1A, the axes of the permanent magnet 5 and of the magnet switch 7 are parallel. The switch 7 is of the kind known in the art as a sealed contact reed relay, rated 0.1 amp at 110 v. A.C., of the normally open type. The switch is not polarized, and accordingly the magnet 5 may be assembled to its case in either direction. Such switches are readily obtainable commercially.

As shown in FIGURES 1A and 2, the vertical member 10 of the detector is secured to a framework member 4 by U-bolt and shim means 11, 12. This provides for, rotation of the detector assembly 1 so that the parallel axes of the magnet 5 and the switch 7 may be adjusted to be parallel to the cable 2, for raising and lowering the assembly, and, by means of the shims 12, for centering with respect to the cable.

The magnet 5 and switch 7, as well as leads from the switch, are preferably potted in their respective enclosures—that is, are sealed and held rigidly by a suitable high temperature sealing compound, not shown, well known in the art.

In FIGURES 3 and 4, the flux of the field of the permanent magnet 5 is indicated generally by the broken lines $\phi$. In FIGURE 3 the cable 2, of permeable magnetic material, is in normal position between the magnet and the magnetic switch 7. In this condition, most of the flux passes through the cable 2, as indicated at $\phi_2$. Some lines $\phi_7$ do pass through the switch 7 but, as explained, are not sufficient to actuate the (normally open) magnetic switch 7 to close it. In the FIGURE 4 condition, the cable is derailed. Thus the space between the magnet and the switch is free of magnetic material and, accordingly, there is a strong flux $\phi_7^1$ through the switch 7, which flux causes the switch contacts to close. Thus the detector discriminates between the normal cable position (FIGURES 1A and 2) and the derailed position thereof.

Cable systems of the subject kind may be operated by an electric motor. Since the switch 7 is rated at 0.1 ampere, obvious normally closed power relay means may conveniently be used to control the motor, which is not shown.

FIGURE 5 is a block diagram showing one such arrangement. When the cable is derailed, the magnetic switch closes as above explained. This causes the 110 v. A.C. relay power supply shown to activate the power relay, thus opening the power circuit to the electric motor prime mover, so stopping it.

When the prime mover is an internal combustion engine, the relay (which in this case might be of the normally open type) cooperates with suitable circuitry to stop the internal combustion engine.

While to use my detector to control the prime mover, it is necessary to connect it to suitable circuitry, such central circuitry is not in itself a part of my invention. There are numerous alternative circuits, well known in the art, to accomplish the same results. These may be used in lieu of the particular circuit shown.

The foregoing detail description is given by way of example and is not, except as stated in the appended claims, intended in a limiting sense.

What I claim is:

1. In an aerial tramway, the combination of a carrying cable of magnetically permeable material, cable supporting means including a sheave normally having said cable in engagement therewith, and proper cable position detecting means comprising a magnet mounted on said cable supporting means at one side of said cable, a magnetically actuated electric switch mounted on said cable supporting means at the relatively opposite side of the cable from said magnet whereby the cable in its normal sheave engaging position passes in a plane between the magnet and the switch, said switch having operative and inoperative positions, the field strength of said magnet normally being absorbed by said cable when the latter is in its proper sheave engaging position and said switch is in its operative position, but said switch being actuated to its inoperative position by the field of the magnet when the cable is displaced from its proper position between the magnet and the switch, and holder means for mounting the magnet and the switch on said cable supporting means, said holder means comprising clamp means provided on sadi supporting means, a vertical standard vertically slidably adjustable in said clamp means, and a pair of transversely spaced casings of non-magnetic material provided on said standard and containing said magnet and said switch respectively, said clamp means being laterally adjustable whereby the standard with said magnet and said switch may be adjusted laterally relative to said cable, and vertical adjustment of the standard in the clamp means permitting the magnet and switch to be raised and lowered relative to the cable.

2. The combination as defined in claim 1 wherein said magnet and said switch are elongated in the direction of said cable, said standard being rotatably adjustable in said clamp means whereby the magnet and switch may be adjusted to a parallel position relative to the cable.

References Cited by the Examiner

UNITED STATES PATENTS

| | | | |
|---|---|---|---|
| 3,071,083 | 1/1963 | Hochmuth | 104—178 |
| 3,115,847 | 12/1963 | Turner et al. | 104—178 |
| 3,140,670 | 7/1964 | Renninger | 104—178 |
| 3,155,792 | 11/1964 | Werts | 200—87 |

FOREIGN PATENTS 609,736   9/1960   Italy.

ARTHUR L. LA POINT, *Primary Examiner.*

EUGENE G. BOTZ, *Examiner.*

F. W. MONAGHAN, D. E. HOFFMAN,
*Assistant Examiners.*